United States Patent [19]

Harada et al.

[11] Patent Number: 5,191,539
[45] Date of Patent: Mar. 2, 1993

[54] CONTROL APPARATUS FOR AN INJECTION MOLDING MACHINE

[75] Inventors: Susumu Harada; Hideo Tanaka; Kiyoshi Sasaki; Tsuginobu Totani, all of Numazu, Japan

[73] Assignee: Toshita Kikai Kabushiki Kaisha, Tokyo, Japan

[21] Appl. No.: 548,689

[22] Filed: Jul. 6, 1990

[30] Foreign Application Priority Data

Jul. 6, 1989 [JP] Japan .................... 1-176354

[51] Int. Cl.$^5$ .............................. G06F 15/46
[52] U.S. Cl. .................. 364/476; 364/188; 364/744; 425/149
[58] Field of Search ........... 364/476, 473, 188, 189, 364/191, 192, 744, 745; 340/711; 425/149, 150, 170, 171, 173, 135; 264/40.1, 40.5, 40.7

[56] References Cited

U.S. PATENT DOCUMENTS

| | | | |
|---|---|---|---|
| 3,622,768 | 11/1971 | Clark | 364/744 |
| 4,156,921 | 5/1979 | Wenninger et al. | 364/744 |
| 4,189,765 | 2/1980 | Kotalik et al. | 364/188 |
| 4,674,053 | 6/1987 | Bannai et al. | 364/476 |
| 5,005,116 | 4/1991 | Fujita et al. | 364/476 |

FOREIGN PATENT DOCUMENTS

59-158237 9/1984 Japan .
61-53823 3/1986 Japan .

Primary Examiner—Joseph Ruggiero
Attorney, Agent, or Firm—Cushman, Darby & Cushman

[57] ABSTRACT

A control apparatus for an injection molding machine has a unit for setting data corresponding to a molding operation of the injection molding machine and for controlling the molding operation of the machine based on a setting of a setting unit. The setting unit has a register for holding numerical input data, an input/output control unit for inputting and outputting numerical value data to and from the register on the basis of an external command, a numerical value manipulating unit for incrementing and decrementing the numerical value data in the register through a manual operation, a numerical value display unit for displaying numerical value data stored in the register, and a place position shifting unit for shifting set places in the numerical value display and in the numerical value manipulating unit on the basis of the number of places in the integer part of the numerical value data.

10 Claims, 10 Drawing Sheets

CONTROL APPARATUS FOR AN INJECTION MOLDING MACHINE

BACKGROUND OF THE INVENTION

1. Field of the Invention

The present invention relates to a control apparatus for an injection molding machine and more particularly to such a control apparatus which displays a numerical value data set externally and allows an operator to operate while directly viewing the data.

2. Description of the Prior Art

Conventionally, in order to properly perform a desired molding operation, a control apparatus for an injection molding machine controls the operation of the machine using data on various numerical values and monitors and adjusts the actual operating state of the injection machine.

In order for the operator to set, adjust and confirm data on various numerical values quickly and surely, the applicants have proposed a control apparatus for an injection molding machine in which the indication of a control panel, the disposition of operating elements and the correspondence between the operating elements are easily understood to thereby improve visuality and operability (Japanese Patent Application No. 58-32581).

Figure 9:
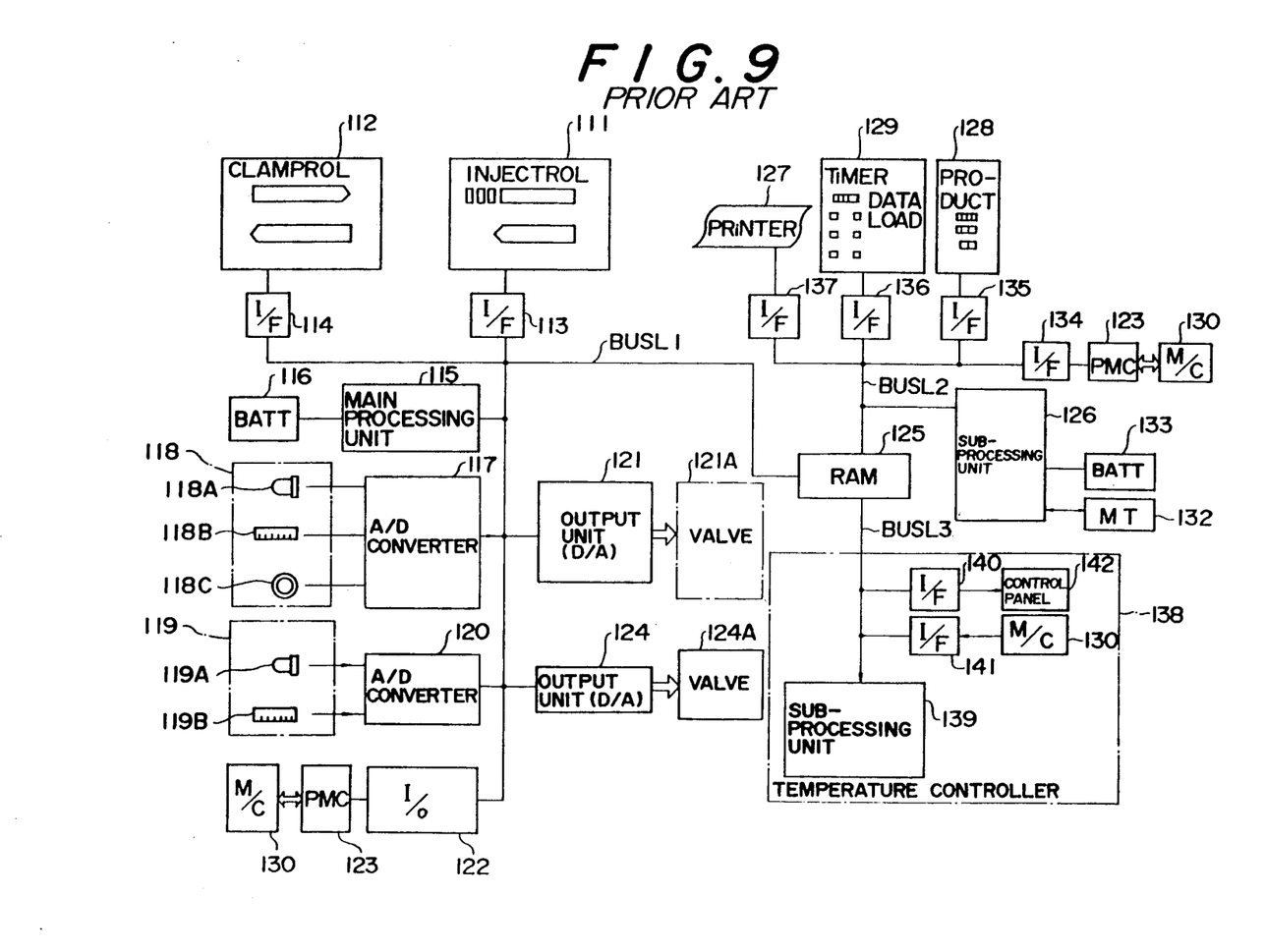
FIG. 9 is a block diagram of a control apparatus for an injection molding machine.

FIG. 9 shows a control apparatus for an injection molding machine which includes a main processing system connected with a bus-line BUSL1 and subprocessing systems connected with bus-lines BUSL2 and BUSL3.

The bus-line BUSL1 is connected with a main processing unit 115; a common RAM 125; output units 121, 124; control panels 111, 112 through interfaces 11,, 114, respectively; input units 118, 119 of the injection molding machine through A/D converters 117, 120, respectively; and a sequencer 123 through an I/O unit 122.

The main processing unit 115 includes an internal memory (not shown) backed up by a battery 116 and stores various numerical value data which are exchanged through the bus-line BUSL1. The main processing unit 115 includes a non-volatile program memory which stores programs for processing various data, generates operation commands in accordance with settings on the control panels 111, 112 and inputs from the input units 118 and 119, and outputs them to the output units 121, 124 to control the injection molding machine.

The control panels 111, 112 each include an operating unit for setting and adjusting data and a display for displaying the set data. Data necessary for the injecting operation is set in the control panel 111 while data necessary for the clamping operation is set in the control panel 112.

The input units 118 and 119 each detect the executing state of the injection molding machine. The input unit 118 obtains status signals related to the injecting operation by means of an injection pressure sensor 118A, a linear scale 118B for detecting the position of a screw in the injecting operation and a tachometer 118C for detecting the rotational speed of the screw required in conjunction with the metering process. The input unit 119 obtains status signals related to the clamping operation by means of a clamping pressure sensor 119A and a linear scale 119B for detecting the position of a moving mold.

The output units 121, 124 each perform a D/A converting operation on an operation command signal from the main processing unit 115. The output unit 121 actuates a valve device 121A such as an electromagnetic flow valve or a relief valve provided in the injection portion of the injection molding machine in accordance with a command for the injecting operation. The output unit 124 actuates a valve device 124A provided in the clamping portion of the machine in accordance with a command for the clamping operation.

The sequencer 123 obtains signals from detectors 130 such as limit switches disposed at the respective particular elements of the injection molding machine during the injection and clamping operations and provides control of the interlocking relationship between the respective elements.

The common RAM 125 also connected with the bus-lines BUSL2 and BUSL3 is a buffer memory which is used for mutual exchange of data between the respective elements connected with the bus-lines BUSL2 and BUSL3 and the main processing unit 115.

The elements connected with the bus-line BUSL2 are a sub-processing unit 126; a printer 127 through an interface 137; a production management information setting unit 128 through an interface 135; a control panel 129 through an interface 136; and a sequencer 123 through an interface 134.

The sub-processing unit 126 includes an internal memory (not shown) backed up by a battery 133 and stores molding data-mass corresponding to a used mold. The sub-processing unit 126 is also connected to an external storage medium such as a magnetic tape device 132 to thereby load a data group corresponding to the used mold and to save changed a data group. The sub-processing unit 126 employs a system for beforehand storing a data group corresponding to a plurality of molds or a system for sequentially loading a data group corresponding to each of the molds to be used.

The printer 127 prints out a data group stored in the common RAM 125 or in the sub-processing unit 126.

The production management information setting unit 128 designates a mold to be used for molding and sets the number of shots of moldings molded by that mold.

The control panel 129 controls loading data in the sub-processing unit 126 and data transfer between the sub-processing unit 126 and the main-processing unit 115 and sets and displays a molding cycle time corresponding to a mold and moldings produced thereby and also displays an injection cycle time and a time required for blowing air against the mold.

The sequencer 123 outputs to the injection molding machine an alarm signal indicative of overtime when a time (for example, a first molding cycle time) set on the control panel 129 is exceeded.

The elements connected with the bus-line BUSL3 are the subprocessing unit 139; a control panel 142 through an interface 140; and thermometers 130 disposed at the particular elements of the molding machine through an interface 141 to thereby constitute a temperature controller 138.

The subprocessing unit 139 monitors, for example, the temperature of oil within the hydraulic unit and the actual temperature within the resin melting cylinder from the thermometers 130 and adjusts the temperature of the molding machine in accordance with a setting at the control panel 142 and a preset program.

In the control apparatus, the respective displays and operating units in the control panels 111, 112, 129 and 142 are arranged in such a manner that the operator can visually confirm the advancement of the molding operation properly.

Figure 10:
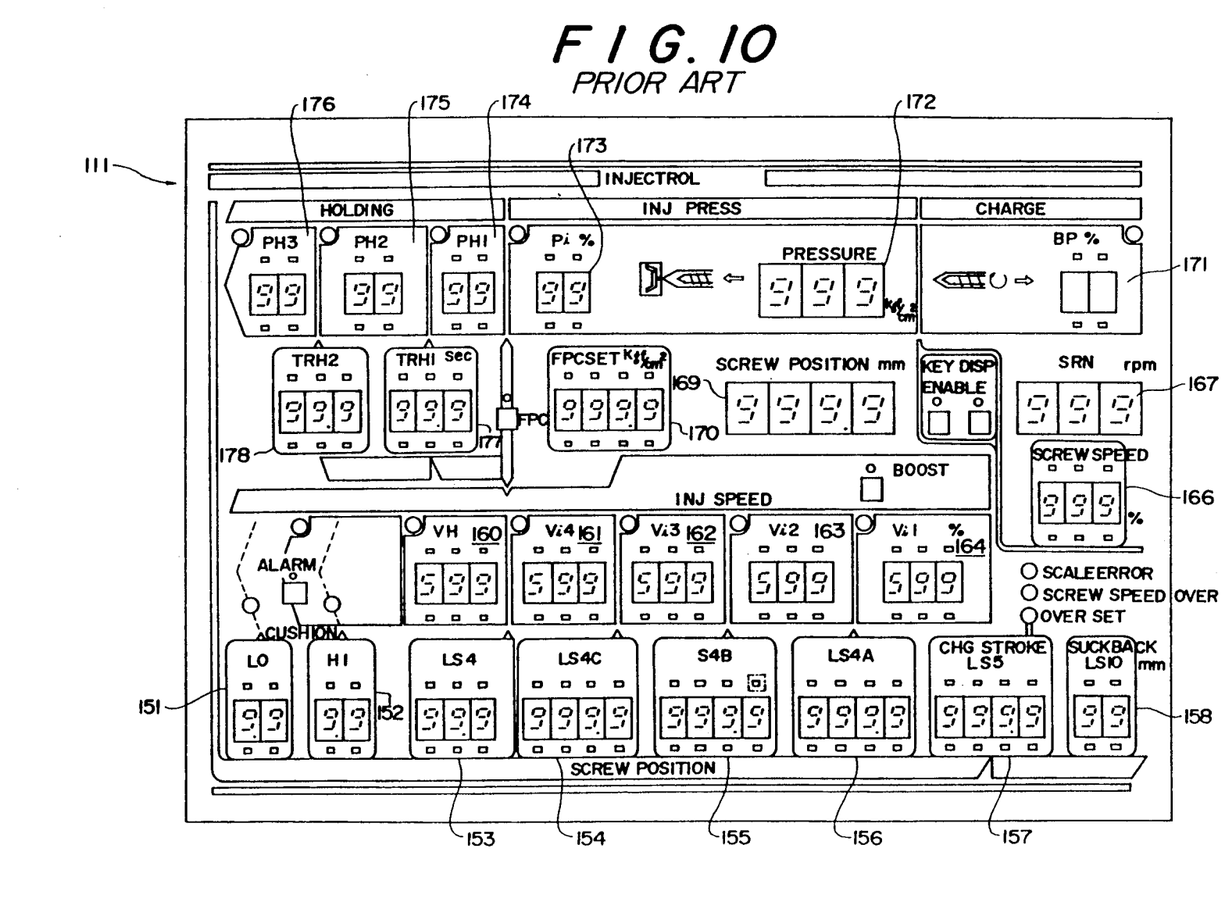
FIG. 10 is a front view of a control panel of the control apparatus.

As shown in FIG. 10, the control panel 111 digitally displays various data by means of LEDs. Displayed data are collected for each system to improve readability for confirmation and operation. Main data such as injection pressure 172, screw position 169 and screw rotational speed 167 are displayed on large displays for ease of visual confirmation. Digital switches are used to permit digital display and adjustment of the values of data 151-158, 160-164, 166, 170, 171, 173-178 which require confirmation, adjustment and setting.

For those digital switches, the applicants have proposed an electronic digital switch unit in which numerical values held by registers are displayed by means of LEDs and push buttons disposed above and below the displays are used to increases and decrease the numerical values (see Japanese Patent Application No. 59-174171).

There are other digital switches in which respective place modules are connected to provide a required number of places where necessary. There are also switches in which respective modules are connected by signal lines to easily take a figure up/down one place automatically.

The respective positions of displayed places are set appropriately when required in digital switches in the control panels of the control apparatus for the above mentioned conventional injection molding machine.

For example, if the number of displayed places is 3, where two places are used for an integer part and one place for a decimal part, the displayed numerical value is 0.0-99.9, so that numerical values in a range of 0-100 can be handled in units of 0.1. If one place is used for the integer part and two places are used for the decimal part, a displayed numerical value is 0.00-9.99, so that numerical values in a range of 0-10 can be handled in units of 0.01.

Since operation buttons corresponding to the positions of displayed places set numerical values in the digital switches of the conventional control apparatus, however, the buttons are fixed at preset positions of places for mutual correspondence, so that various inconveniences will occur in use.

For example, if handling three significant figures is considered, a numerical value in a range of 0-100 is required to be handled in units of 0.01 in order to cover numerical values such as 1.23 and 12.3. In order to cope with this in a fixed-point system, a display such as 01.23-12.30 is required to be implemented using four figures. Therefore, as the number of places increases, cost, scale and space for installation increase while some ineffective places are produced among the set displayed places.

When various numerical value data are accommodated in a fixed board region to show all the pieces of data, an increase in the number of displayed places in the digital switch is a big obstacle to the arrangement.

It is an object of the present invention to provide a control apparatus for an injection molding machine which ensures a sufficient range and accuracy of numerical data displayed or set with a small number of displayed places.

SUMMARY OF THE INVENTION

The present invention provides a control apparatus for an injection molding machine which comprises a unit for setting numerical value data corresponding to the molding operation of the injection molding machine and controlling the molding operation of the machine in accordance with the setting by the setting unit, wherein the setting unit comprises: a register for holding the numerical value data; a input/output control means for inputting and outputting the numerical value data stored in the register in accordance with an external command; a numerical value manipulating unit for incrementing and decrementing the numerical value data stored in the register by a manual operation; a numerical value display for displaying the numerical value data stored in the register; and a place position shifting means for shifting set places in the numerical value display and in the numerical value manipulating unit in accordance with the number of places of an integer part of the numerical value data.

As described above, in the present invention, the numerical value display unit displays numerical value data in the register while the numerical value manipulating unit manipulates a numerical value for each place. The place position shifting means permits a simultaneous shift of place settings including a decimal point in the numerical value display unit and the numerical value manipulating unit to ensure the relation correspondence between the display unit and the manipulating unit. If the number of places of an integer part of manipulated numerical value data increases, the position of places is shifted rightward whereas if it decreases conversely, the position of places is shifted leftward. Thus, the effective use of displayed places by the display of significant figures for the set number of places is possible, and the range of display of numerical data handled is increased while the display accuracy is ensured. Thus, the above object is achieved.

DETAILED DESCRIPTION OF THE PREFERRED EMBODIMENT

One embodiment of the present invention will be described hereinafter with reference to the drawings.

Figure 1:
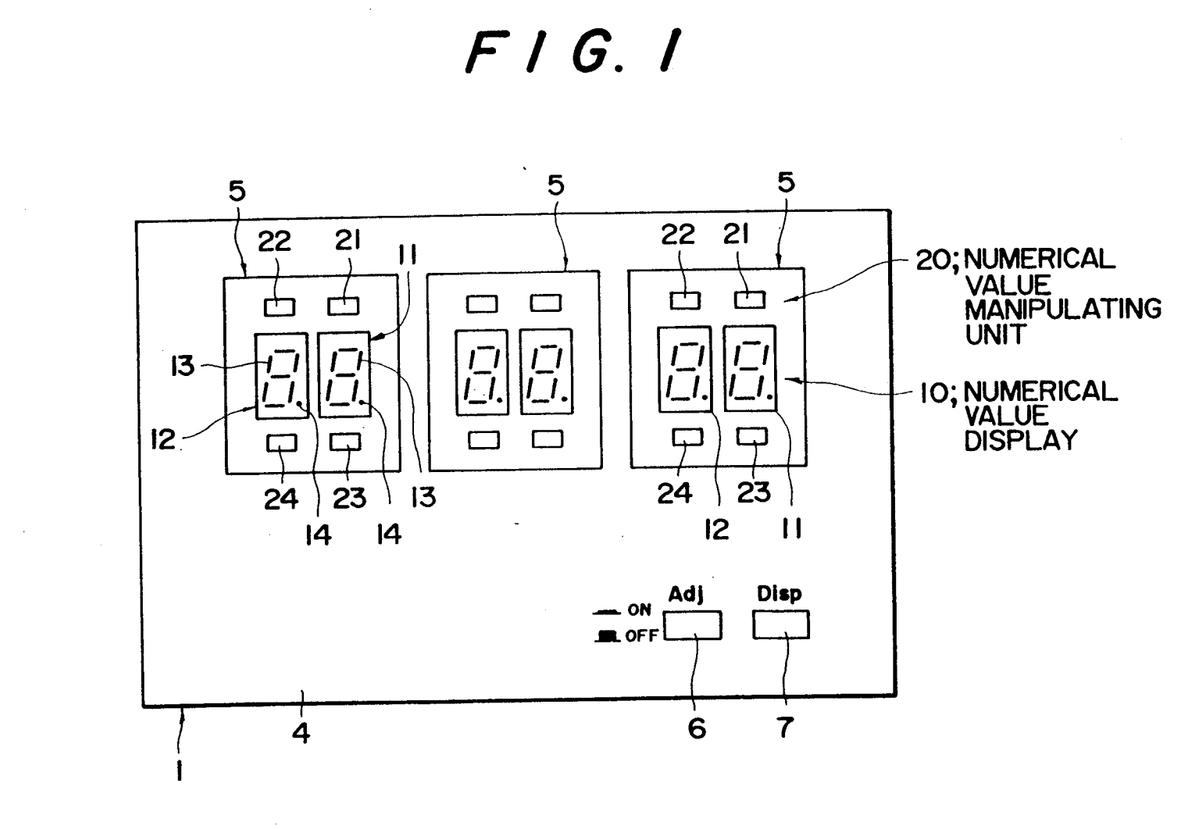
FIG. 1 is a front view of one embodiment of the present invention.
Figure 2:
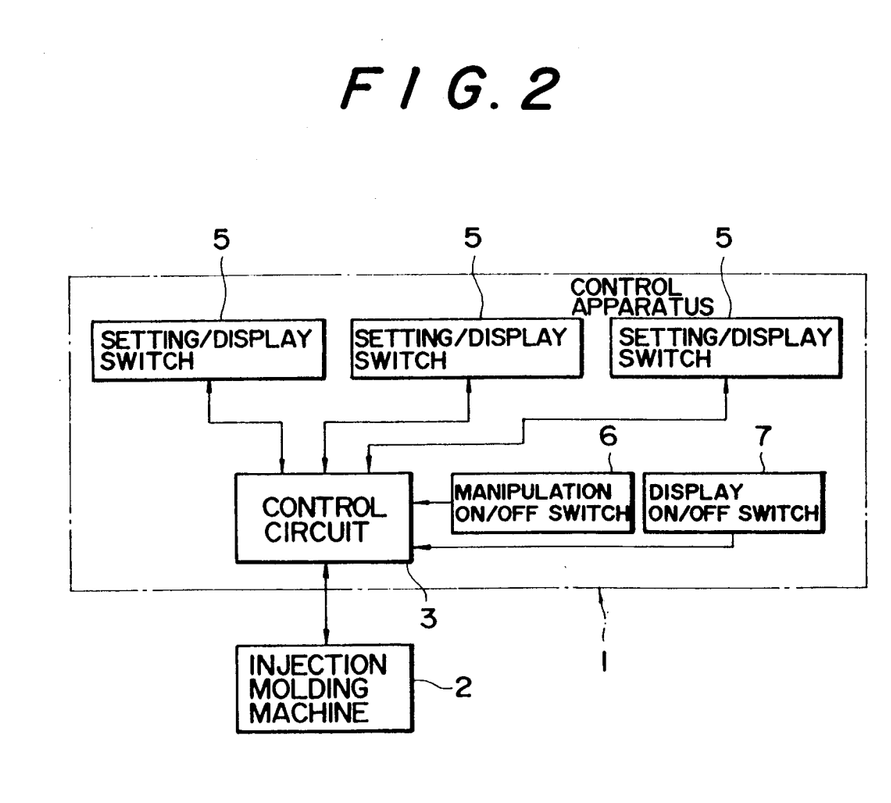
FIG. 2 is a block diagram of the entire construction of the embodiment.

In FIGS. 1 and 2, a control apparatus 1 is basically the same one as the control apparatus shown in FIG. 9 and includes a control circuit 3 and a control panel 4 for control of an injection molding machine 2. A plurality of setting/display switches 5 are provided as a setting unit in the control panel 4 for displaying and setting numerical value data for control.

Each setting/display switch 5 includes a numerical value display 10 provided with a pair of LED displays 11 and 12 disposed thereon in order to display numerical data set in the control circuit 3, using two figures. These displays 11 and 12 each use a 7-segment LED 13 for display of a numeral and a spot-like decimal point display LED 14 at a right-hand lower corner for display of a decimal point. A pair of incremental buttons 21 and 22 and a pair of decremental buttons 23 and 24 are disposed above and below the corresponding displays 11 and 12. A numerical manipulating unit 20 having buttons 21-24 adjustably increases or decreases a numerical value for a displayed place in each of the displays 11 and 12.

A manipulation ON/OFF switch 6 and a display ON/OFF switch 7 are provided on the control panel 4. The control circuit 3 outputs a manipulation ON/OFF command and a display ON/OFF command to each switch 5 in accordance with the respective set states of the switches 6 and 7. Display of each setting/display switch 5 is performed only when the switch 7 is "ON", and the manipulation of each display can be performed only when the switch 6 is "ON".

The setting/display switch 5 in the present embodiment is constituted so as to allow automatic setting of the position of displayed places including a decimal point display.

Figure 3:
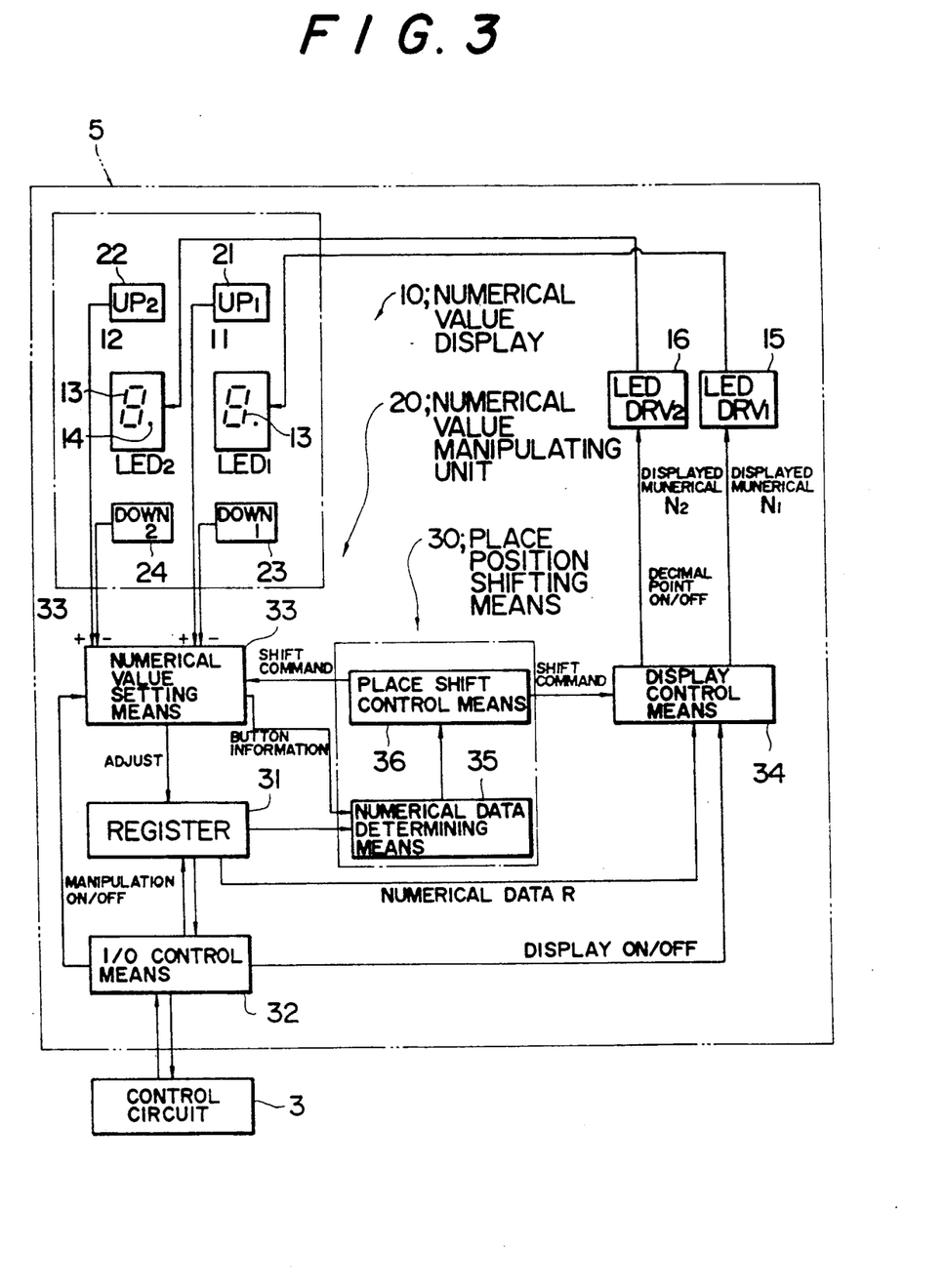
FIG. 3 is a block diagram of a setting/display switch of the embodiment.

In FIG. 3, the setting/display switch 5 includes a register 31 to hold numerical value data. The register 31 is connected with input/output control means 32 which stores in the register 31 predetermined numerical value data from the control circuits 3 and outputs numerical value data from the register 31 to the control circuit 3 in accordance with a request from the control circuit 3.

Connected with the register 31 is a numerical value setting means 33 which is connected with the respective buttons 21-24 on the switches. Each time the incremental button 21 or the decremental button 23 is pressed, a less significant place manipulating unit is added or subtracted to or from the numerical value data in the register 31 while each time the incremental button 22 or the decremental button 24 is pressed, a more significant place manipulating unit is added or subtracted to or from the numerical value data in the register 31. The less significant manipulating unit is 1 or 0.1 corresponding to the place setting in the display 12 while the more significant manipulating unit is 10 or 1 corresponding to the place setting in the display 12. These manipulating units each are selected in accordance with a shift command given externally. The numerical manipulating unit 20 is constituted by the buttons 21-24 and the numerical value setting means 33.

The register 31 is connected with a display control means 34 which is, in turn, connected with displays 11 and 12 on the switches through LED drivers 15 and 16, respectively. The displays 11 and 12 are driven to display desired numerical values by allocating to drivers 15 and 16 numerical values N1, N2 indicative of a numerical value data in the register 31 in double places and causing the drivers 15 and 16 to control the respective lighted states of the LEDs 13 and 14 in accordance with the allocated numerical values. The display control means 34 determines the numerical values N1, N2 in accordance with the place setting of either of "10" and "1" places or "1" and "0.1" places. The place setting is changed in accordance with an external shift command. The display control means 34 outputs a decimal point ON/OFF command to the driver 16 in accordance with these place settings to control the lighted state of the LED 14 of the display 12 of the more significant place. The numerical value display 10 is constituted by the displays 11, 12, drivers 15, 16 and display control means 34.

When the position of the places is shifted rightward (the more significant place "1" is shifted to "10" and the less significant place "0.1" to "1"), the numeral value at the less significant "0.1" place will be lost. The arrangement is such that for the numerical value, decimal portions of 0.5 and over are counted as a unit and the rest is cut away or the least significant figure of the numerical value is taken up one place and the results are returned from the numerical value setting means 33 to the register 31 to maintain consistent processing.

Connected to the numerical value setting means 33 and the display control means 34 is place position shifting means 30 for simultaneously shifting the displayed and manipulated positions of the places in the means 33 and 34, respectively. The shifting means 30 includes numerical value data determining means 35 and place shift control means 36.

The numerical value data determining means 35 reads numerical value data in the register 31 and compares the read data with determination criteria preset in accordance with the respective buttons 21-24 identified by the numerical value setting means 33, and determines a change in the number of places of an integer portion of the manipulated numerical value data. The determination criteria used are unit numerals 0.1, 1, 10 displayable with two places and a combination of these unit numbers; namely, 11, 20, 9.0, 9.9.

The place shift control means 36 determines whether or not the displayed position of places is to be shifted in accordance with the result of the determination by the numerical value data determining means 35 and outputs a shift command to the numerical value setting means 33 and the display control means 34 when required.

A display ON/OFF command from the control circuit 3 is output from the input/output control means 32 to the display control means 34 to thereby enable the numerical display 10 for displaying purposes only when the display ON/OFF switch 7 is on. A manipulation ON/OFF command from the control circuit 3 is output from the input/output control means 32 to the numerical value setting means 33. Thus, only when the manipulation ON/OFF switch is on are the respective operations of the buttons accepted to thereby enable the numerical value manipulating unit 20.

In the setting/display switch 5 of the present embodiment, numerical value data R input from the input/output control means 32 to the register 31 is converted to a numerical value of double figures by the display control means 34 and the more significant figure is displayed in the display 12 while the less significant figure is displayed in the display 11 to bring about a standby state in which pressing the buttons 21-24 is awaited.

Under such conditions, if any of the buttons is pressed, the numerical value data determining means 35 checks the numerical value data R in the register 31 and determines the position of places of newly set/displayed numerical value data in accordance with the determination criteria corresponding to button information from the numerical value setting means 33. Subsequent to this determination, the numerical value setting means 33 performs an adding/subtracting operation on the numerical value data R in the register 31 in manipulating units set in the manipulating buttons at the current point of time. When shifting the position of places of the new data is determined to be necessary if the adding/subtracting operations are performed on the numerical value data R in the determination, the place shift control means 36 issues a rightward or leftward shift command to the display control means 34 and the numerical value setting means 33. In accordance with this shift command, the display control means 34 changes the position of places of the numerical value data in each of the displays 11 and 12 while the numerical value setting means 33 changes the manipulating unit, and the lower significant incremental and decremental buttons 21 and 23 stay in a state corresponding to the display 11 while the more significant incremental and decremental buttons 22 and 24 stay in a state corresponding to the display 12.

These processing operations are carried out as a series of steps corresponding to the respective buttons, as shown in FIGS. 4-7.

Figure 4:
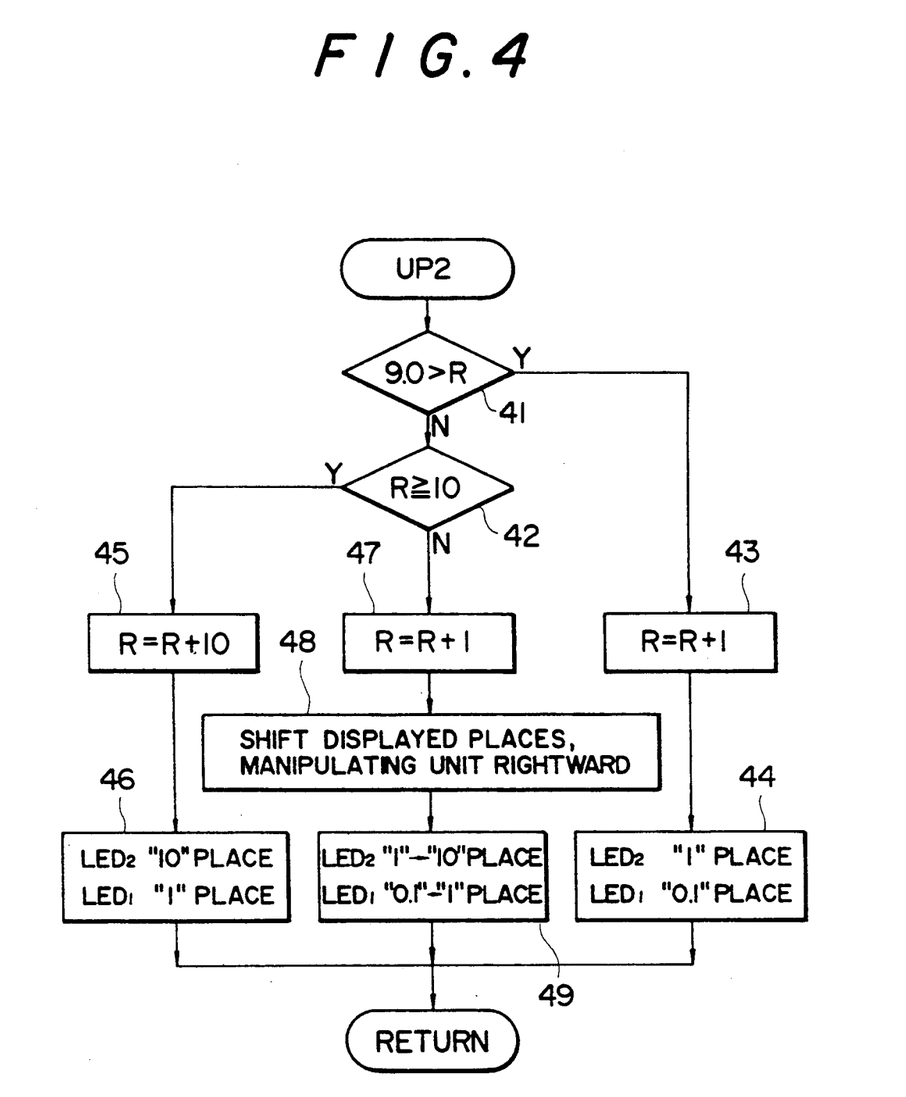
FIGS. 4-7 each are a flowchart indicative of processing in the embodiment.

As shown in FIG. 4, when the incremental button 22 (UP2) is pressed, determination (steps 41, 42) is made in accordance with determination criterion values 10, 9.0 (=10−1) corresponding to button information (UP2=ON).

If the numerical value data R is less than 9.0, the more significant place manipulating unit "1" is added to the value R when the decimal point display LED 14 is on (step 43), and the resulting data R is displayed in the displays 12 (LED2) and 11 (LED1) used as the "1" and "0.1" places, respectively (step 44).

If the numerical value data R is equal to or larger than 10, the more significant place manipulating unit "10" is added to the numerical value data R when the decimal point display LED 14 is off (step 45), and the resulting data R is displayed in the LEDs 2 and 1 used as the "10" and "1" places, respectively (step 46).

If the numerical data R is less than 10 and equal to or larger than 9.0, the more significant place manipulating unit "1" is added to the numerical value data R when the decimal point display LED 14 is on (step 47), the displayed place and the manipulating unit are shifted rightward, the LED2 is changed from the "1" place to the "10" place, the decimal point display LED 14 is turned off, the LED1 is changed from the "0.1" place to the "1" place, the more significant manipulating unit is changed from "1" to "10", the lower significant manipulating unit is changed from the "0.1" to "1" (step 48), and, under such conditions, the resulting numerical data R is displayed in the LEDs 2 and 1 (step 49).

Figure 8:
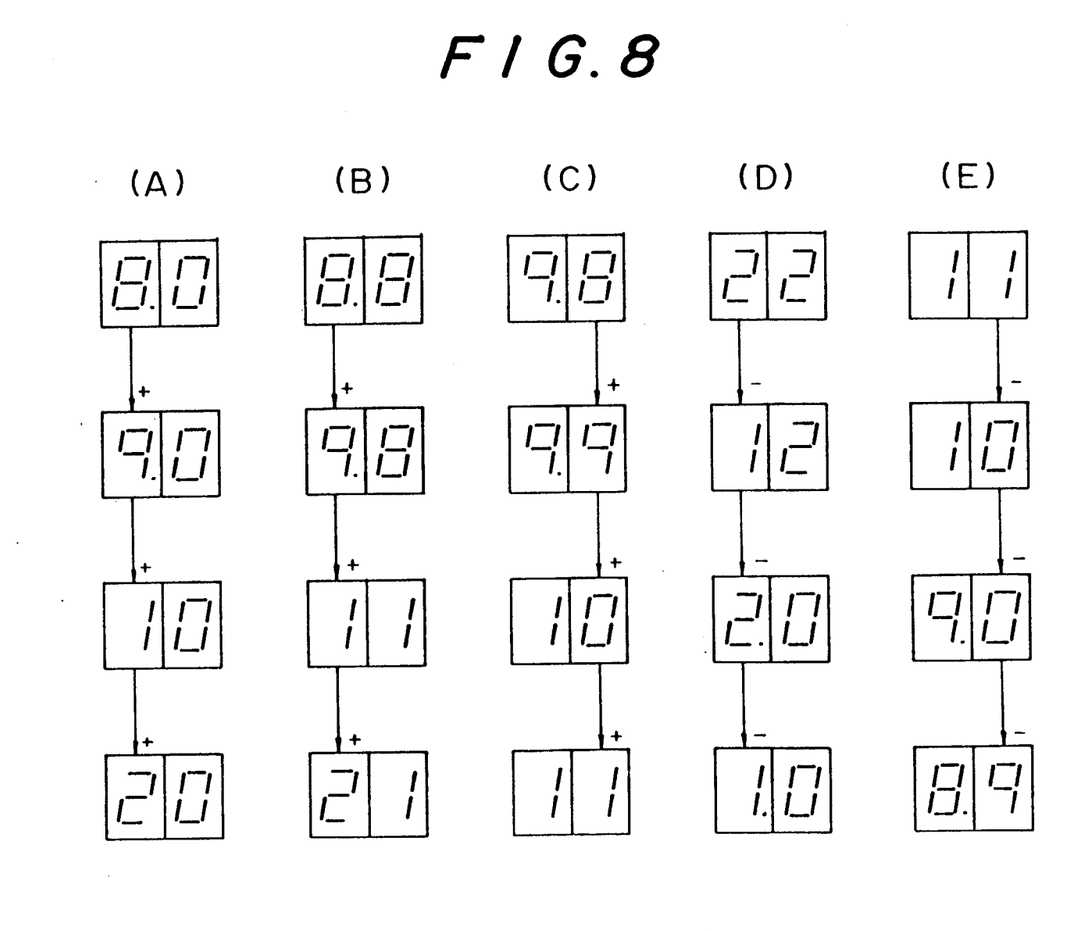
FIG. 8 is a schematic view of displays in the embodiment.

Therefore, as shown in FIG. 8(A), if the incremental button 22 is pressed when the current display is 8.0, the displayed value is incremented by one to become 9.0 by steps 43-44. Subsequently, if the button 22 is pressed, the value is incremented by one, the decimal point display LED 14 is turned off, and the display is changed to 10 (steps 47-49). If the button 22 is further pressed, the value is incremented by 10 and the display is changed to 20 (steps 45, 46).

If the incremental button 22 is pressed when the current display is 8.8 as shown in FIG. 8(B), the display is change sequentially to 9.8, 11 and 21, which is performed when the setting is made such that, for the original value (10.8), decimal parts of 0.5 and over are counted as a unit and the rest is cut away when the decimal point is shifted in the steps 47-49. If the rest is cut away, the displays are changed to 9.8, 10 and 20 sequentially.

Figure 5:
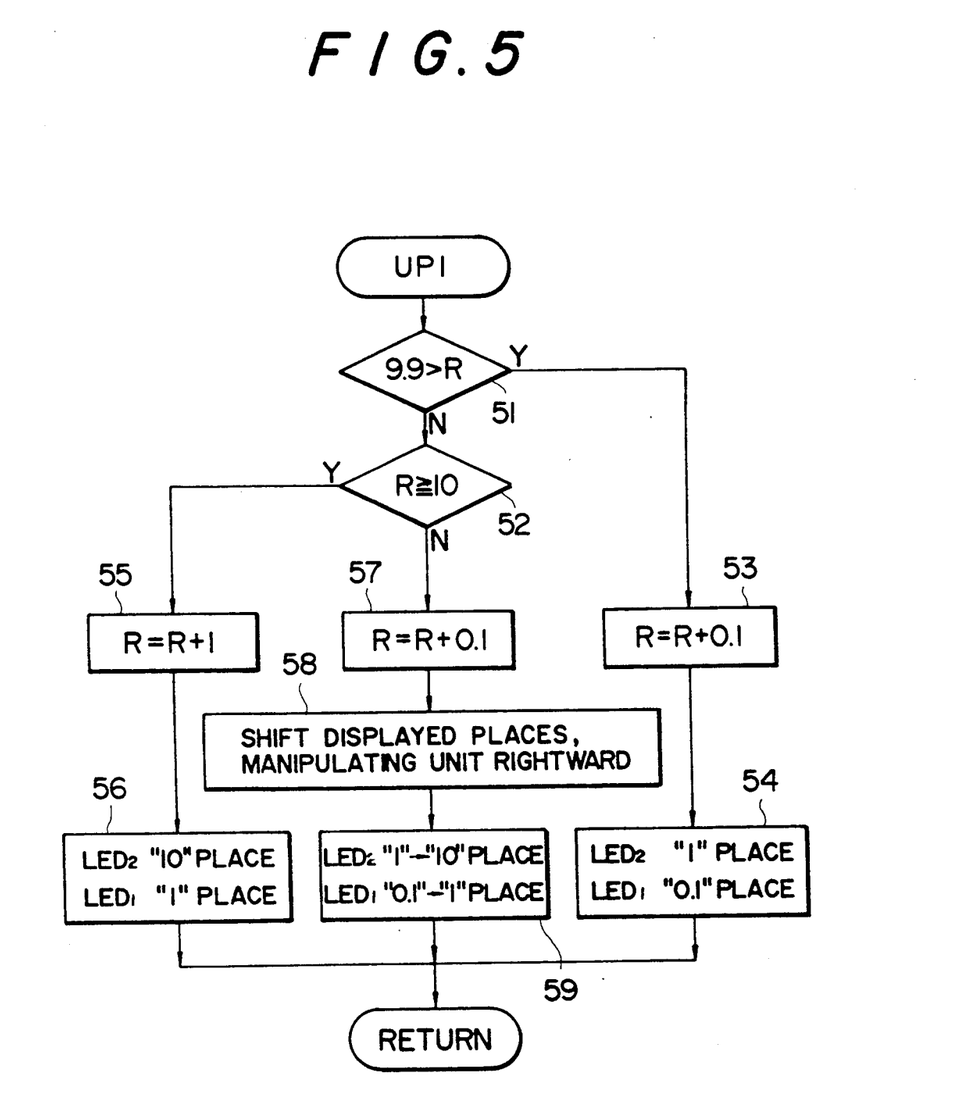

As shown in FIG. 5, when the incremental button 21 (UP1) is pressed, determination is made in accordance with determination criterion values "9.9" (=10−0.1) and "10" corresponding to button information (UP1=ON) (steps 51, 52).

If the numerical data R is less than 9.9, the less significant place manipulating unit "0.1" is added to the numerical data R when the decimal point display LED 14 is on (step 53), and the resulting data is displayed in the LEDs 2 and 1 used as the "1" and "0.1" places, respectively (step 54).

If the numerical data R is equal to or more than 10, the less significant place manipulating unit "1" is added to the data R when the decimal point display LED 14 is on (step 55) and the resulting data is displayed in the LEDs 2 and 1 used as "10" and "1" places, respectively (step 56).

If the numerical data R is equal to or more than 9.9 and less than 10 (=9.9), the less significant place manipulating unit "0.1" is added to the numerical value data R (step 57), the displayed place and the manipulating unit are shifted rightward (step 58 similar to the step 48) under which conditions the numerical value data R is displayed in the LEDs 2 and 1 (step 59).

Therefore, if the incremental button 21 is pressed when the current display is 9.8 as shown in FIG. 8(C), the value is incremented by 0.1 and the display is changed to 9.9 (steps 53-54). Subsequently, if the button 21 is pressed, the value is incremented by 0.1, the decimal point display LED 14 is turned off and the display is changed to 10 (steps 57-59). If the button 24 is further pressed, the value is incremented by 1 and the display is changed to 11 (steps 55-56).

Figure 6:
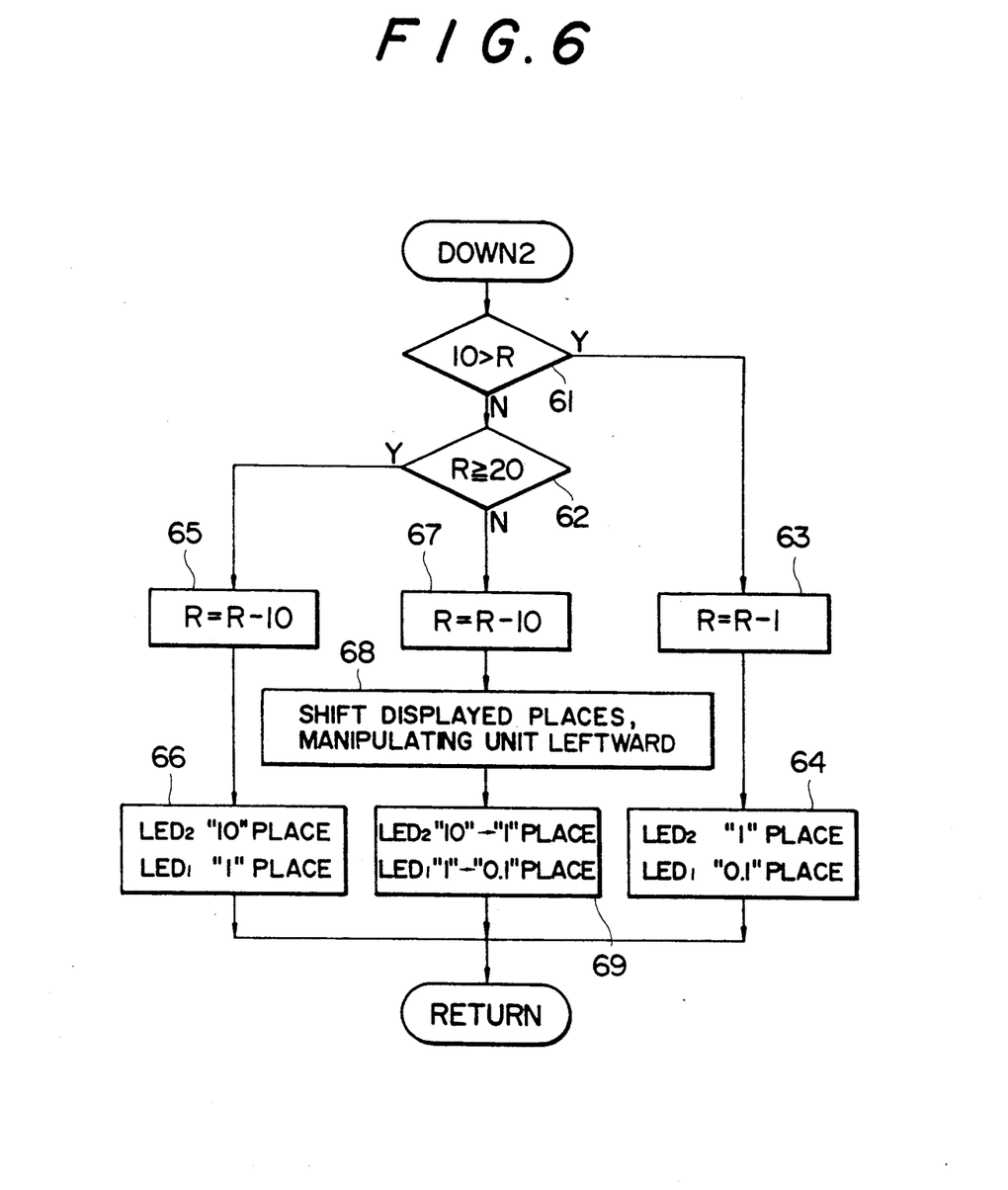

As shown in FIG. 6, if the incremental button 24 (DOWN 2) is pressed, determination is made in accordance with determination criterion values "10", "20" (=10+10) corresponding to button information (DOWN 2=ON) (steps 61, 62).

If the numerical value data R is less than 10, the more significant place manipulating unit "1" is subtracted from the numerical value data R when the decimal point display LED 14 is on (step 63), and the resulting data is displayed in the LEDs 2 and 1 used as the "1" and "0.1" places, respectively (step 64).

If the numerical data R is equal to more than 20, the more significant place manipulating unit "10" is subtracted from the numerical value data R when the decimal point display LED 14 is off state (step 65), and the resulting data is displayed in the LEDs 2 and 1 used as the "10" and "1" places, respectively (step 66).

If the numerical data R is equal to or more than 10 and less than 20, the more significant place manipulating unit "10" is subtracted from the numerical data R when the decimal point display LED 14 is off (step 67), the displayed place and the manipulating unit are shifted leftward, the LED2 is changed from the "10" place to the "1" place, the decimal point display is changed to "on", the LED1 is changed from the "1" place to the "0.1" place, the more significant place manipulating unit is changed from "10" to "1" and the less significant place manipulating unit is changed from "1" to "0.1" (step 68), and, under such conditions, the numerical data R is displayed in the LEDs 2 and 1 (step 69).

As shown in FIG. 8(D), if the decremental button 24 is pressed when the current display is 22, the value is decremented by 10 and the display is changed to 12 (steps 65-66). If the button 24 is pressed subsequently, the value is decremented by 10, the decimal point is displayed and the display is changed to 2.0 (steps 67-69). If the button 24 is further pressed, the displayed value is decremented by 1 and the display is changed to 1.0 (steps 63, 64).

Figure 7:
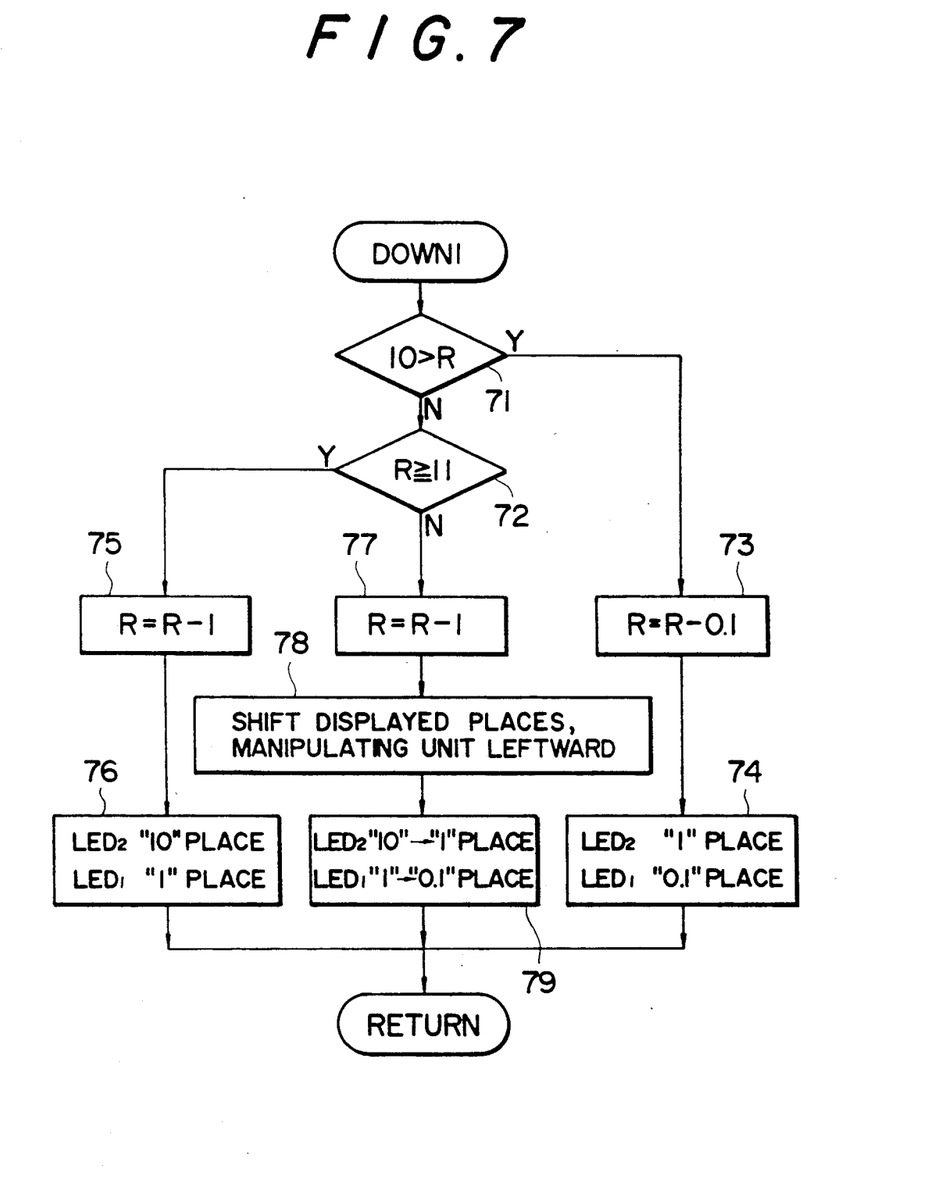

As shown in FIG. 7, if the decremental button 21 (DOWN1) is pressed, determination is made in accordance with determination criterion values 10, 11 (=10+1) corresponding to button information (DOWN1=ON) (steps 71, 72).

If the numerical data R is less than 10, the more significant place manipulating unit "0.1" is subtracted from the numerical value data R when the decimal point display LED 14 is on (step 73) and the resulting data is displayed in the LEDs 2 and 1 used as the "1" and "0.1" places (step 74).

If the numerical data R is equal to or more than 11 at step 72, the less significant place manipulating unit "1" is subtracted from the numerical data R when the decimal point display LED 14 is off (step 75) and the resulting data is displayed in the LEDs 2 and 1 used as the "10" and "1" places, respectively (step 76).

If the numerical value data R is equal to or more than 10 and less than 11, the less significant place manipulating unit "1" is subtracted from the numerical value data R when the decimal point display LED 14 is off (step 77), the display places and the manipulating unit are shifted leftward (step 78 similar to the step 68), and under such condition, the resulting data R is displayed in the LEDs 2 and 1 (step 79).

Therefore, as shown in FIG. 8(E), if the decremental button 23 is pressed when the current display is 11, the value is decremented by one and the display is changed to 10 (steps 75-76). Subsequently, if the button 23 is pressed, the value is decremented by one and a decimal point is given and the display is changed to 9.0 (steps 77-79). If the button 23 is then pressed, the value is decremented by 0.1 and the display is changed to 8.9 (steps 73, 76).

As described above, according to the present embodiment, the following advantages are produced:

The double-place numerical value display 10 can automatically switch between a display of a two-place integer part such as 99-10 and a display of a one-place integer and one-place decimal part such as 9.9-0.0.

Therefore, when the display range of numerical value data is 0-99, a precise display of 0.0-9.9 can be made in the range of 0- less than 10. A two significant digit display is realized and the display accuracy of a small value is improved without impairing the display and the width of a region set by the numerical value manipulating unit 20.

Since selection of the display places of numerical value data and the decimal point is automatically performed by the place position shifting means 30, no manual operations are required according to a numerical value each time a setting is made and thus the setting is performed efficiently.

Since the place setting in the numerical value manipulating unit 20 is changed automatically by the place position shifting means 30 in accordance with a change of the place setting in the numerical display 10, the correspondence in place between the displayed numerical value and the button operation can be maintained and readability and operability of the display is maintained.

Since the place setting of the numerical value manipulating unit 20 is performed by selection of a manipulating unit by the respective buttons 21-24, problems such as complication of the operating procedures can be avoided and the stabilized operation can be realized easily.

The present invention is not restricted to the above embodiment and is intended to include modifications described below:

While in the above embodiment the numerical data determining means 35 and the place shift control means 36 are provided as the place position shifting means 30 to perform the processing of FIGS. 4-7 in accordance with button information, the contents to be processed and the executing means are required to be substantially similar and may be actually changed when required.

Selection of the number of displayed places and the decimal point is not restricted to processes which are performed in accordance with pressed buttons as mentioned above and may be applied to processes for determining the contents of the register, for example, when any one of the buttons is pressed.

Alternatively, the present invention is applicable to a system which monitors the contents of a register at all times irrespective of button operations, performs required processing when there is a change in the numerical data held in the register and displays figures at optimal places.

In such a case, use may be made of the structure of a regular fixed-place type digital switch which increments and decrements numerical value data in the register in accordance with a button operation to thereby allow the present invention to be carried out easily and inexpensively.

While a numerical value at the original least significant place is described as being subjected to a processing operation in which decimal parts of 0.5 and over are counted as a unit and the rest is cut away, for example, for taking a figure up one place when the position of the places is shifted rightward, it may be simply cut away. Since the adjusted numerical value data is not required to be returned to the register 31, the structure is simplified.

The number of displayed places in the numerical value display 10 is not limited to two and may be equal to or higher than three. If a plurality of places are used for display, the arrangement may be such that a decimal point can move through the overall place width, so that a decimal point can move through a specified part of the place width or so that it can move through specified discrete place widths. In these arrangements, readability should be considered.

The displays 11 and 12 are not restricted to LEDs and may be units, or standardized half-finished modules, such as LCDs which can be visually recognized in response to electrical input.

The remaining structural portions of the setting/display switch 5 may be appropriately selected when the invention is carried out. The structure for taking a figure up or down one place may be a conventional appropriate one and the manipulation ON/OFF switch and the display ON/OFF switch may be changed in structure or omitted when required.

The control apparatus of the present invention is not limited to the above-described embodiment but is also applicable to and may be used in various control apparatus for injection molding machines in which control and change of numerical value data displays are necessary.

As mentioned above, according to the present invention, the position of a decimal point and the position of a displayed place in the numerical value display can be automatically shifted simultaneously with the place setting in the numerical manipulating unit and the range and accuracy of display of numerical value data using a small number of displayed places are ensured. Therefore, a limited space in the control panel of the control apparatus for the injection molding machine is utilized efficiently and high accuracy and high simultaneous readability of the displays are ensured.

What is claimed is:

1. Setting unit in a control apparatus for an injection molding machine having a unit for setting numerical value data corresponding to a molding operation of the injection molding machine and for controlling the molding operation of the machine in accordance with a setting of the setting unit, said setting unit comprising:
   a register for storing the numerical value data;
   input/output control means for inputting numerical value data to the register and for outputting numerical value data stored in the register, said inputting and outputting being responsive to an external command;
   numerical value manipulating means for incrementing the numerical value data stored in said register and for decrementing the numerical value stored in said register, said incrementing and decrementing being responsive to a manual operation;
   a numerical value display for displaying the numerical value data stored in said register; and
   place position shifting means for automatically shifting set places in said numerical value display and for shifting set places in said numerical value manipulating means responsive to a number of places of an integer part of the numerical value data.

2. A control apparatus as in claim 1, said place position shifting means comprising numerical value data determining means for comparing the numerical value data in said register with a preset determination criterion value and determining a change in a number of places of an integer part of the numerical value data obtained by operating said numerical value manipulating unit, thereby determining whether positions of displayed digits in said displayed numerical value data are required to be shifted.

3. A control apparatus as in claim 1, said numerical value display comprising display control means for determining respective displayed numerical values for specified places from the numerical value data in said register and displaying the determined displayed numerical values at corresponding positions of places in said numerical value display.

4. A control apparatus as in claim 1, said numerical value manipulating unit comprising incremental buttons and decremental buttons corresponding to respective places in said numerical value display.

5. A control apparatus as in claim 4, said numerical value manipulating unit comprising numerical value setting means for adding a different significant place manipulating unit to the numerical value data in said register each time one of the incremental buttons is pressed and subtracting a different significant place manipulating unit from the numerical value data in said register each time a different one of said decremental buttons is pressed.

6. A control apparatus as in claim 1, wherein said input/output control means is for selectively enabling and disabling said numerical value manipulating unit.

7. A control apparatus as in claim 1, wherein said input/output control means is for selectively enabling and disabling said numerical value display.

8. An apparatus as in claim 1, further comprising numeric shifting means for simultaneously shifting the position of a manipulated place in said numerical value manipulating unit and the position of a displayed place in said numerical value display responsive to a shift command from said place position shifting means.

9. A control apparatus for an injection molding machine having a unit for setting numerical value data corresponding to a molding operation of the injection molding machine and for controlling the molding operation of the machine in accordance with a setting of a setting unit, said setting unit comprising:
   a register for storing the numerical value data;
   input/output control means for inputting numerical value data to the register and for outputting numerical value data stored in the register, said inputting and outputting being responsive to an external command;
   numerical value manipulating means for incrementing numerical value data stored in said register and for decrementing numerical value stored in said register, said incrementing and decrementing being responsive to a manual operation;
   a numerical value display for displaying the numerical value data stored in said register; and
   place position shifting means for shifting set places in said numerical value display and for shifting set places in said numerical value manipulating means responsive to a number of places of an integer part of the numerical value data, said place position shifting means comprising numerical value data determining means for comparing the numerical value data in said register with a preset determination criterion value and determining a change in number of places of an integer part of the numerical value data obtained by operating said numerical value manipulating unit, thereby determining whether positions of displayed digits in said displayed numerical value data are required to be shifted.

10. Setting unit in a control apparatus for an injection molding machine having a unit for setting numerical value data corresponding to a molding operation of the injection molding machine and for controlling the molding operation of the machine in accordance with a setting of a setting unit, said setting unit comprising:
   a register for storing the numerical value data;
   input/output control means for inputting numerical value data to the register and for outputting numerical value data stored in the register, said inputting and outputting being responsive to an external command;
   numerical value manipulating means for incrementing numerical value data stored in said register and for decrementing numerical value stored in said register, said incrementing and decrementing being responsive to a manual operation;
   a numerical value display for displaying the numerical value data stored in said register; and
   place position shifting means for shifting set places in said numerical value display and for shifting set places in said numerical value manipulating means responsive to a number of places of an integer part of the numerical value data; and
   numeric shifting means for simultaneously shifting the position of a manipulated place in said numerical value manipulating unit and a displayed place in said numerical value display responsive to a shift command from said place position shifting means.

* * * * *

UNITED STATES PATENT AND TRADEMARK OFFICE
CERTIFICATE OF CORRECTION

PATENT NO. : 5,191,539

DATED : March 2, 1993

INVENTOR(S) : HARADA et al.

It is certified that error appears in the above-identified patent and that said Letters Patent is hereby corrected as shown below:

On the title page, Item [30]:
        under "Foreign Application Priority Data" please insert the following line:

--June 19, 1990 [JP] Japan ............2-160264--

Signed and Sealed this

Twenty-fifth Day of January, 1994

Attest:

BRUCE LEHMAN

*Attesting Officer*      *Commissioner of Patents and Trademarks*